(12) United States Patent
Panda et al.

(10) Patent No.: US 8,175,574 B1
(45) Date of Patent: May 8, 2012

(54) METHODS AND SYSTEMS FOR SELECTING ONE OR MORE CHARGING PROFILES FOR A MOBILE DATA SERVICE SESSION

(75) Inventors: Biswaranjan Panda, Santa Clara, CA (US); Jayaraman Iyer, Sunnyvale, CA (US); Weimin Ma, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1282 days.

(21) Appl. No.: 11/414,121

(22) Filed: Apr. 28, 2006

(51) Int. Cl.
*H04M 11/00* (2006.01)
*H04M 1/66* (2006.01)
*H04M 15/00* (2006.01)
*H04W 24/00* (2009.01)
*H04B 7/216* (2006.01)

(52) U.S. Cl. ..... 455/406; 455/405; 455/410; 455/456.5; 379/114.2; 370/320

(58) Field of Classification Search .................. 455/406, 455/410, 411
See application file for complete search history.

(56) References Cited

U.S. PATENT DOCUMENTS

| | | | |
|---|---|---|---|
| 5,592,470 A * | 1/1997 | Rudrapatna et al. | 370/320 |
| 2002/0068545 A1* | 6/2002 | Oyama et al. | 455/406 |
| 2004/0102182 A1* | 5/2004 | Reith et al. | 455/410 |
| 2004/0266391 A1* | 12/2004 | Hafren | 455/405 |
| 2006/0050711 A1* | 3/2006 | Lialiamou et al. | 370/395.2 |
| 2007/0041532 A1* | 2/2007 | Salonen et al. | 379/114.2 |
| 2007/0093258 A1* | 4/2007 | Steenstra et al. | 455/456.5 |
| 2007/0130389 A1* | 6/2007 | Petersson et al. | 710/52 |

* cited by examiner

*Primary Examiner* — Dwayne Bost
*Assistant Examiner* — Timothy Pham
(74) *Attorney, Agent, or Firm* — Stolowitz Ford Cowger LLP (57) ABSTRACT

Methods and systems for selecting one or more charging profiles for a mobile data service session are disclosed. A method includes identifying one or more available sources of charging profiles that each provide a charging profile for a mobile data service user and selecting a charging profile to be used for at least a portion of the mobile data service session based on selection criteria that ranks the available sources of charging profiles. Access is provided to the selected charging profile for use in billing the mobile data service user.

18 Claims, 6 Drawing Sheets

METHODS AND SYSTEMS FOR SELECTING ONE OR MORE CHARGING PROFILES FOR A MOBILE DATA SERVICE SESSION

TECHNICAL FIELD

Embodiments of the present invention pertain to methods and systems for selecting one or more charging profiles for a mobile data service session.

BACKGROUND ART

The Internet facilitates the access of resources that are available on the world-wide-web. Many different types of services are available that provide access to the Internet. These services provide access to the Internet via various devices such as computers, mobile phones, etc. Mobile data services provide access to the Internet via mobile phones.

Mobile data services facilitate the access of Internet resources by mobile data service customers. Internet based resources that can be accessed by mobile data service customers via mobile data services include services such as world-wide-web services, email, VoIP, text messaging, etc. Mobile data services charge for the use of the services that they provide to mobile data service users.

Mobile data service billing schemes allow mobile data service providers to charge customers for the mobile data services that they use. The systems that facilitate customer billing are maintained by the mobile data service and can be accessed by authorized requestors from service nodes. Conventional mobile data services maintain systems for compiling billing records for its customers.

Charging profiles are used to determine how a particular service user is to be billed. Current charging profiles contain charging information that is based on details of the service that the particular service user is provided.

General Packet Radio Service/Universal Mobile Telecommunications System (GPRS/UMTS) is a mobile data service that is available to users of GSM mobile phones. GPRS/UMTS networks provide data transfer by using unused TDMA channels in the GSM network.

In GPRS/UMTS networks, charging records are generated based on charging profile parameters. The charging profiles are maintained at support nodes of the GPRS/UMTS network. Conventionally, charging profiles for mobile data service users are selected based on charging characteristics data maintained by the GPRS/UMTS network.

Conventional charging characteristics data only provide a limited number of charging profiles for billing purposes. It should be appreciated that the limited number of profiles that are supported by such schemes places a significant limitation on the capacity of mobile data service providers to adequately bill their customers. An additional limitation of conventional mobile data services is the inability to perform location based billing.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Figure 1A:
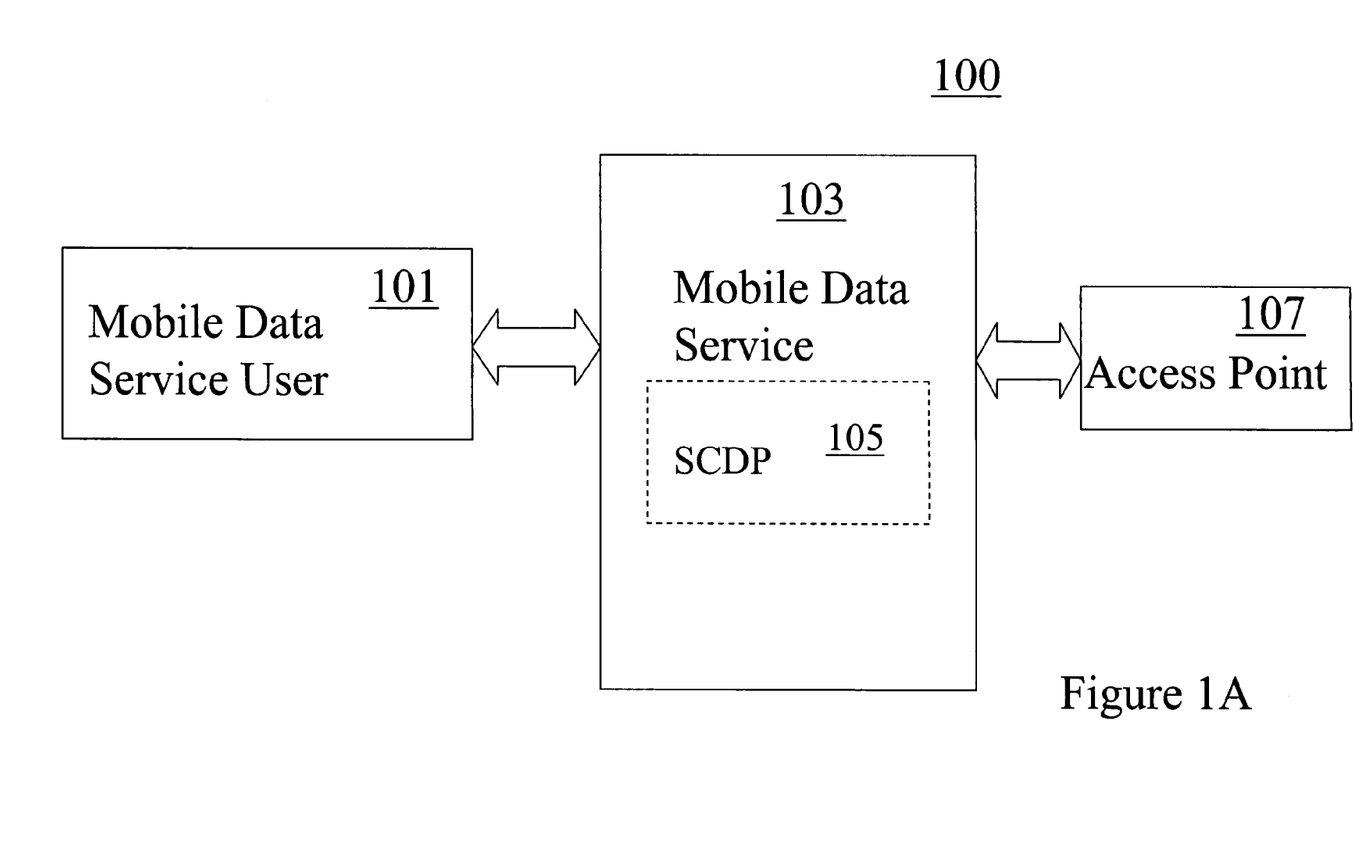
FIG. 1A shows an exemplary network setting of a system for determining a charging profile (SDCP) for a mobile data service session according to one embodiment of the present invention.

Exemplary Network Setting of System for Selecting One or More Charging Profiles for a Mobile Data Service Session According to One Embodiment of the Present Invention FIG. 1A shows an exemplary network setting 100 of a system (SDCP) 105 for selecting one or more charging profiles for a mobile data service session according to one embodiment of the present invention. In one embodiment, SDCP 105 manages a selection of a charging profile to use for a mobile data service session or mobile data session phase. FIG. 1A shows mobile data service user 101, mobile data service 103, SDCP 105 and access point 107.

Referring to FIG. 1A, mobile data service user 101 uses a mobile data telecommunications device (e.g., mobile telephone) to initiate, facilitate and terminate a mobile data service session. In one embodiment, during a mobile data service session, mobile data service user 101 can move among different locations. In one embodiment, location specific data maintained in charging profile server 103E can be used in the selection of a charging profile as is described herein.

Mobile data service 103 facilitates the access by mobile data service user 101 to access point 107. In one embodiment, access point 107 can be an Internet protocol (IP) website or other service to which a mobile device can be connected. In one embodiment, mobile data service 103 can be operated under the control of a mobile device service provider. In one embodiment, mobile data service 103 can include one or more support nodes. In one embodiment, these support nodes can be implemented as data relay devices (e.g., routers, switches, etc.).

Figure 1B:
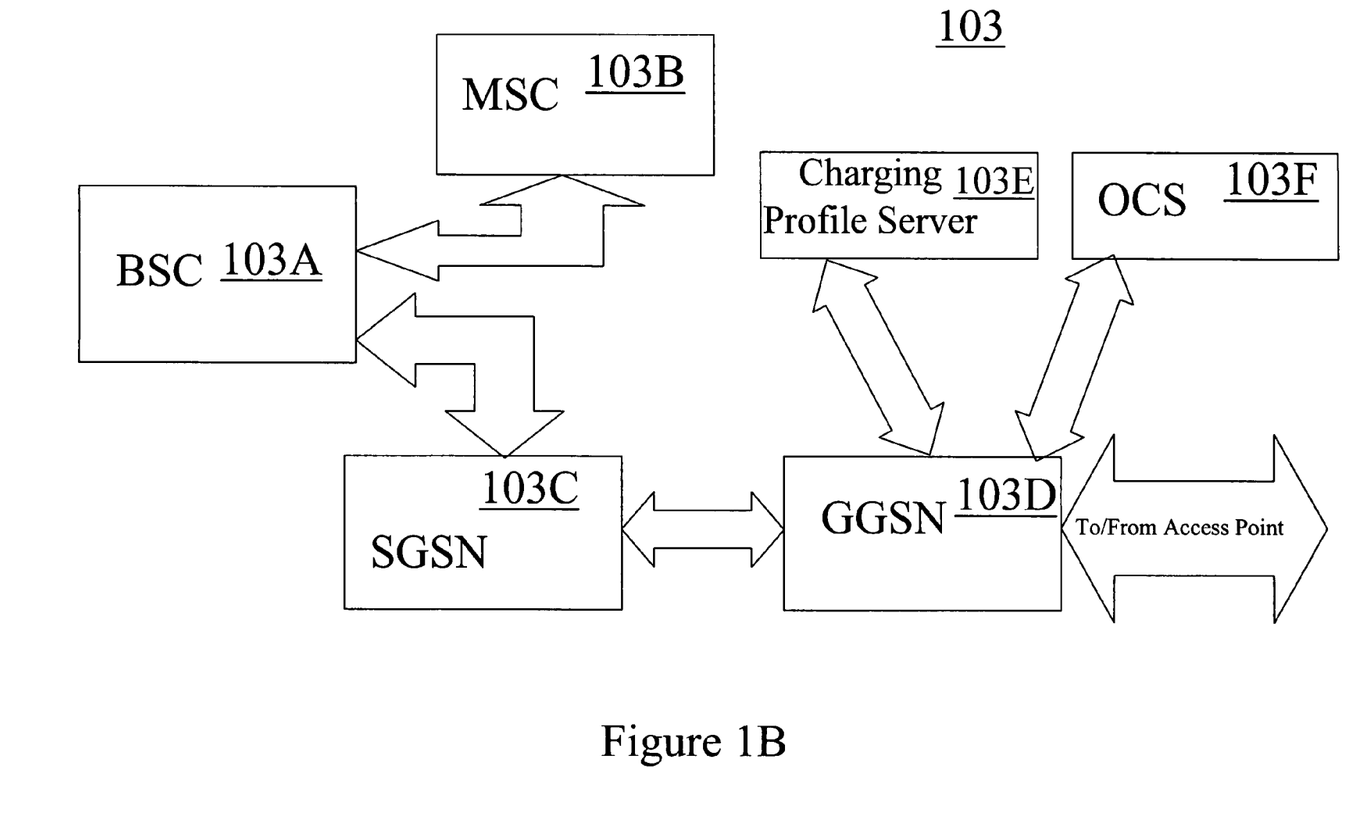
FIG. 1B shows exemplary nodes of a mobile data service according to one embodiment of the present invention.

FIG. 1B shows exemplary components of a mobile data service (e.g., 103) according to one embodiment of the present invention. It should be appreciated that components of mobile data service 103 shown in FIG. 1B are exemplary of one embodiment of the present invention. However other components can be used in other embodiments. In the FIG. 1B embodiment, mobile data service 103 includes base station controller (BSC) 103A, mobile switching center (MSC) 103B, serving support nodes (SGSN) 103C, gateway support nodes (GGSN) 103D, charging profile server 103E and online charging server (OCS) 103F.

Referring to FIG. 1B, BSC 103A is the base station control system that manages base station operations that connect mobile data service users 101 to mobile data service 103. BSC 103A handles allocation of radio channels, receives measurements from mobile phones and controls handovers.

MSC 103B is a telephone exchange that provides circuit-switched calling, mobility management, and global system for mobile communications (GSM) services to mobile data service users 101 as mobile data service users 101 roam within the area that it serves.

SGSN 103C provides charging characteristics to GGSN 103D that correspond to a mobile data service session. In one embodiment, SGSN 103C has the capacity to provide a set number of charging characteristics to GGSN 103D.

GGSN 103D selects charging profiles for mobile data service sessions. Moreover, GGSN 103D generates billing records for mobile data service sessions that are based on the selected charging profiles. In one embodiment, SDCP 105 can reside in GGSN 103D. In other embodiments, SDCP 105 can be separate from but operate cooperatively with GGSN 103D. GGSN 103D provides an interface between mobile data service 103 and other networks such as the Internet or private networks.

Charging profile server 103E provides an expansive set of charging profiles for use in determining mobile data service session charges. In one embodiment, the set of charging profiles provided includes location specific charging profiles that account for mobile data service user location as well as profiles for both pre-paid and post-paid customers. In one embodiment, charging profile server 103E can provide charging profiles both during service authorization and during the actual mobile data service session itself. In one embodiment, the charging profile provided by charging profile server 103E overrides any selection made previously via the charging characteristics or local CGSN 103D configuration.

Online charging server (OCS) 103F is a charging server whose address is contained in the selected charging profile. In one embodiment, this avoids the need for a separate selection mechanism for per-user OCS addresses.

Referring again to FIG. 1A, SDCP 105 manages the selection of one or more charging profiles by GGSN for a mobile data service session as is described in detail herein. In one embodiment, SDCP 105 uses a predetermined selection criteria and information elicited from charging profile server 103E and other available sources of charging profiles to identify one or more charging profiles to be used for a mobile data service session or mobile data service session phase.

Operation

Figure 1C:
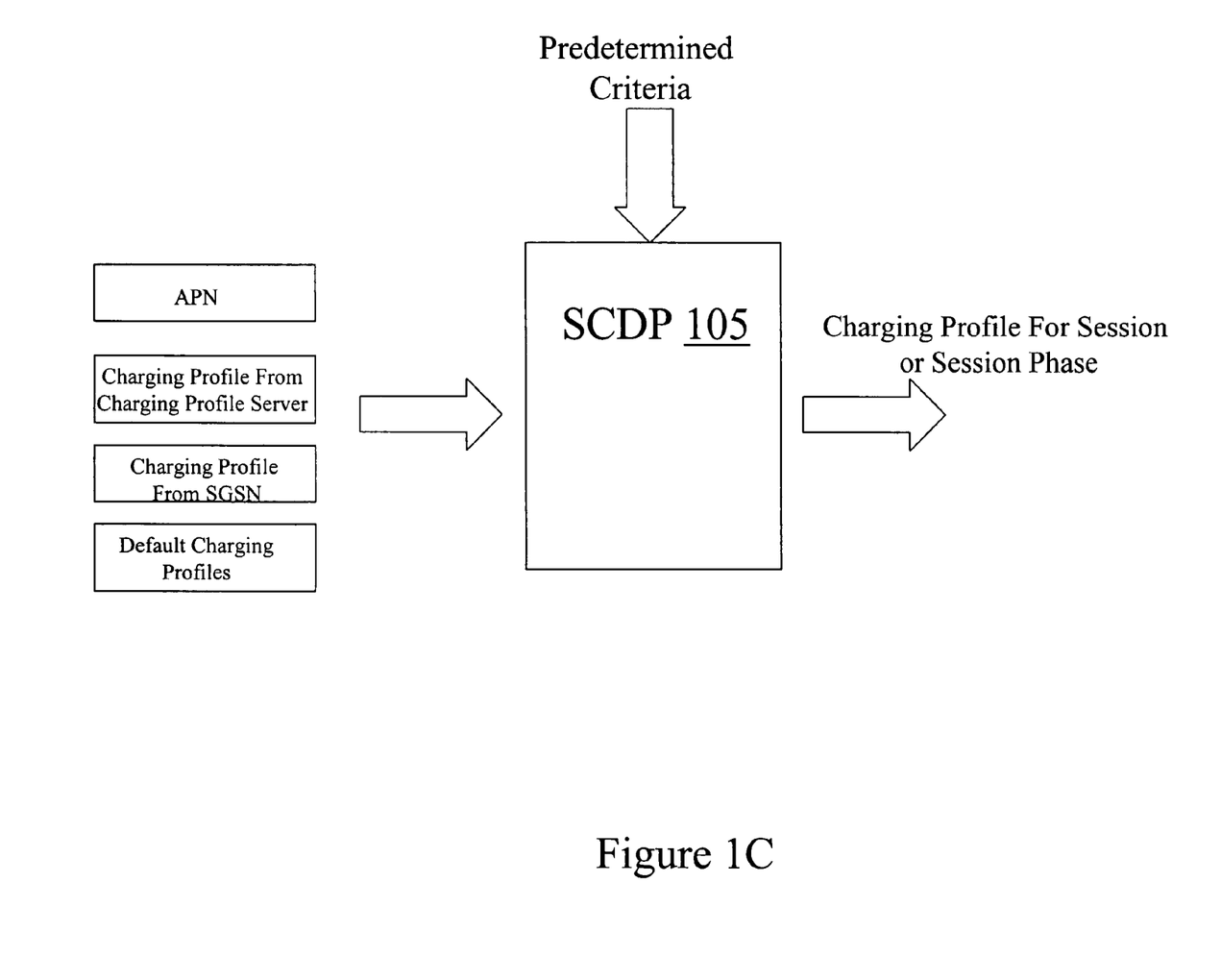
FIG. 1C illustrates the manner in which a session specific charging profile can be determined according to one embodiment of the present invention.

In operation, service user 101 can initiate a mobile data service session using a mobile telecommunications device. Upon initiation of the mobile data service session, an authentication process is performed, during which a charging profile can be accessed by SCDP 105 from charging profile server 103E. In one embodiment, SCDP 105 determines the appropriate charging profile to use for the mobile data service session or session phase based on: (1) the charging profile accessed from charging profile server 103E, (2) and/or other charging profiles that are accessed from other sources and (3) predetermined charging profile selection criteria. As shown in FIG. 1C, SCDP 105 uses predetermined selection criteria 151 and information 153 obtained from charging profile server 103E and other charging profile sources to identify the charging profile that is appropriate for a mobile service session or mobile service session phase.

Figure 2:
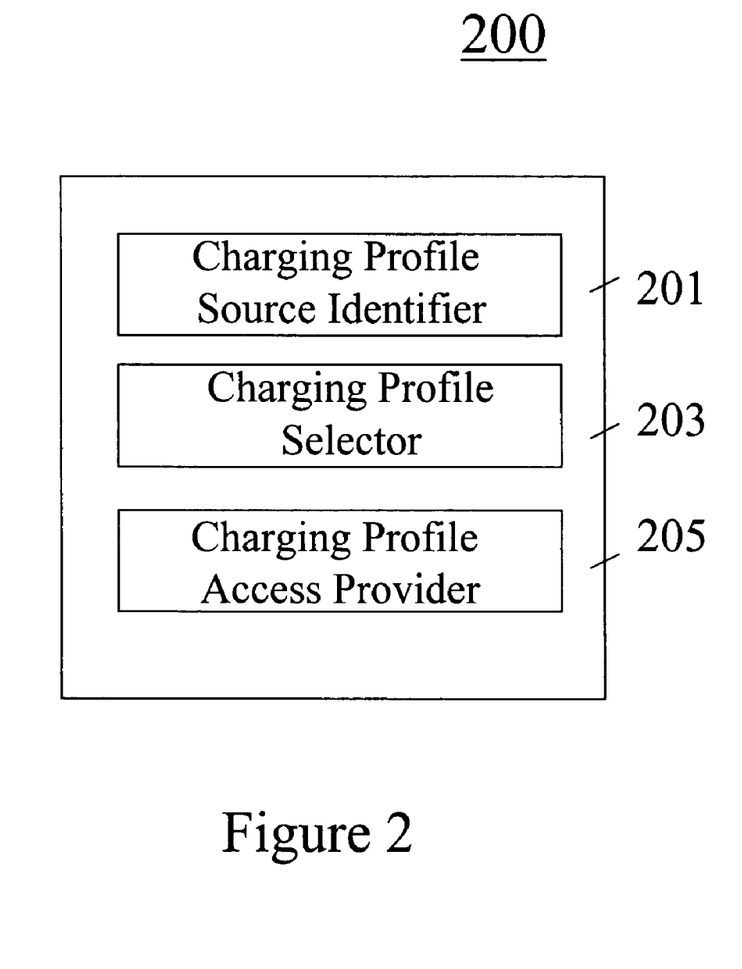
FIG. 2 shows components of system for selecting a charging profile (SDCP) for a mobile data service session according to one embodiment of the present invention.

System for Selecting One or More Charging Profiles
for a Mobile Data Service Session According to One
Embodiment of the Present Invention FIG. 2 shows components of system (SDCP) 105 for selecting one or more charging profiles for a mobile data service session according to one embodiment of the present invention. In one embodiment, SDCP 105 manages the selection of one or more highly particularized charging profiles to use for a mobile data service session. In the FIG. 2 embodiment, SDCP 105 includes charging profile identifier 201, charging profile selector 203 and charging profile access provider 205.

Referring to FIG. 2, charging profile source identifier 201 identifies the charging profile sources from which a charging profile is to be selected. In one embodiment, charging profile source identifier 201 identifies one or more sources of charging profiles that each have an available charging profile for a mobile data service session or mobile data service session phase.

Charging profile selector 203 selects a charging profile from one of the available sources of charging profiles based on selection criteria that ranks the available sources of charging profiles. In one embodiment, charging profile selector selects a charging profile from one of the available sources of charging profiles according to the following charging profile source precedence:

1. Override rule for an access point or box level global
2. Charging profile received from charging profile server
3. Charging profile received from SGSN
4. Default charging profile configured in access point or box In one embodiment, the selected charging profile can include information related to a pre-paid or post-paid status of the mobile data service user. In one embodiment, as previously discussed, for a pre-paid user, the selected charging profile contains the address of an online charging server (OCS) so that a separate selection mechanism for per-user OCS address is not needed.

In one embodiment, a charging profile server (e.g., 103E in FIG. 1B) can dynamically change the charging profile of a user after the establishment of a mobile data service session using change of authorization messages. In one embodiment, this enables the GGSN (e.g., 103D in FIG. 1B) to provide location based billing if charging profile server (103E in FIG. 1B) can determine the location of the user and notify the GGSN (e.g., 103D in FIG. 1B) of the change in charging profile based on the change of location.

Referring again to FIG. 2, charging profile access provider 205 provides access to the selected charging profile for use in billing a mobile data service user. As previously discussed, the selected charging profile can correspond to a mobile data service session or mobile data service session phase.

Figure 3:
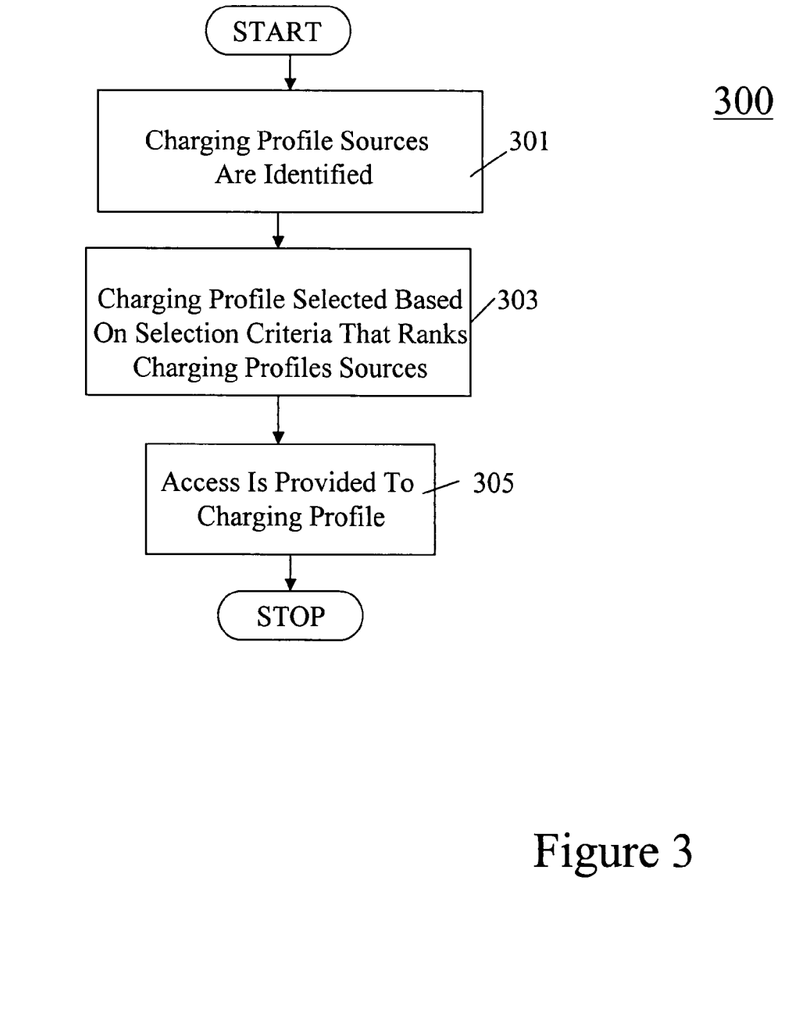
FIG. 3 shows a flowchart of the steps performed in a method for selecting a charging profile (SDCP) for a mobile data service session according to one embodiment of the present invention.

Exemplary Operations of a Method for Selecting
One or More Charging Profiles for a Mobile Data
Service Session According to One Embodiment of
the Present Invention FIG. 3 shows a flowchart 300 of the steps performed in a method for selecting one or more charging profiles for a mobile data service session according to one embodiment of the present invention. The flowchart includes processes of the present invention which, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 3, at step 301, charging profile sources from which a charging profile is to be selected are identified. In one embodiment, a charging profile source identifier (e.g., 201 in FIG. 2) identifies the charging profile sources from which a charging profile is to be selected. In one embodiment, charging profile the source identifier (e.g., 201 in FIG. 2) can identify one or more sources of charging profiles that each have an available charging profile for a mobile data service session or mobile data service session phase.

At step 303, a charging profile is selected based on a selection criteria that ranks the identified sources of charging profiles. In one embodiment, a charging profile selector (e.g., 203 in FIG. 2) selects a charging profile based on selection criteria that ranks the available sources of charging profiles. In one embodiment, charging profile selector selects a charging profile from a charging profile source based on the following charging profile source precedence:
1. Override rule for an access point or box level global
2. Charging profile received from charging profile server
3. Charging profile received from SGSN
4. Default charging profile configured in access point or box In one embodiment, as previously discussed the selected charging profile can include information related to a pre-paid or post-paid status of the mobile data service user. In one embodiment, for a pre-paid user, the selected charging profile contains the address of an online charging server (OCS) so that a separate selection mechanism for per-user OCS address is not needed.

In one embodiment, a charging profile server (e.g., 103E in FIG. 1B) can dynamically change the charging profile of a user after the establishment of a mobile data service session using change of authorization messages. In one embodiment, this enables the GGSN (e.g., 103D in FIG. 1B) to provide location based billing if charging profile server (e.g., 103E in FIG. 1B) can determine the location of the user and notify the GGSN (e.g., 103D in FIG. 1) of the change in charging profile based on the change of location.

At step 305, access is provided to the selected charging profile. In one embodiment, a charging profile access provider (e.g., 205 in FIG. 2) can be used to provide access to a selected charging profile for use in billing a mobile data service user for a mobile data service session or mobile data service session phase.

Exemplary Hardware in Accordance with
Embodiments of the Present Invention

Figure 4:
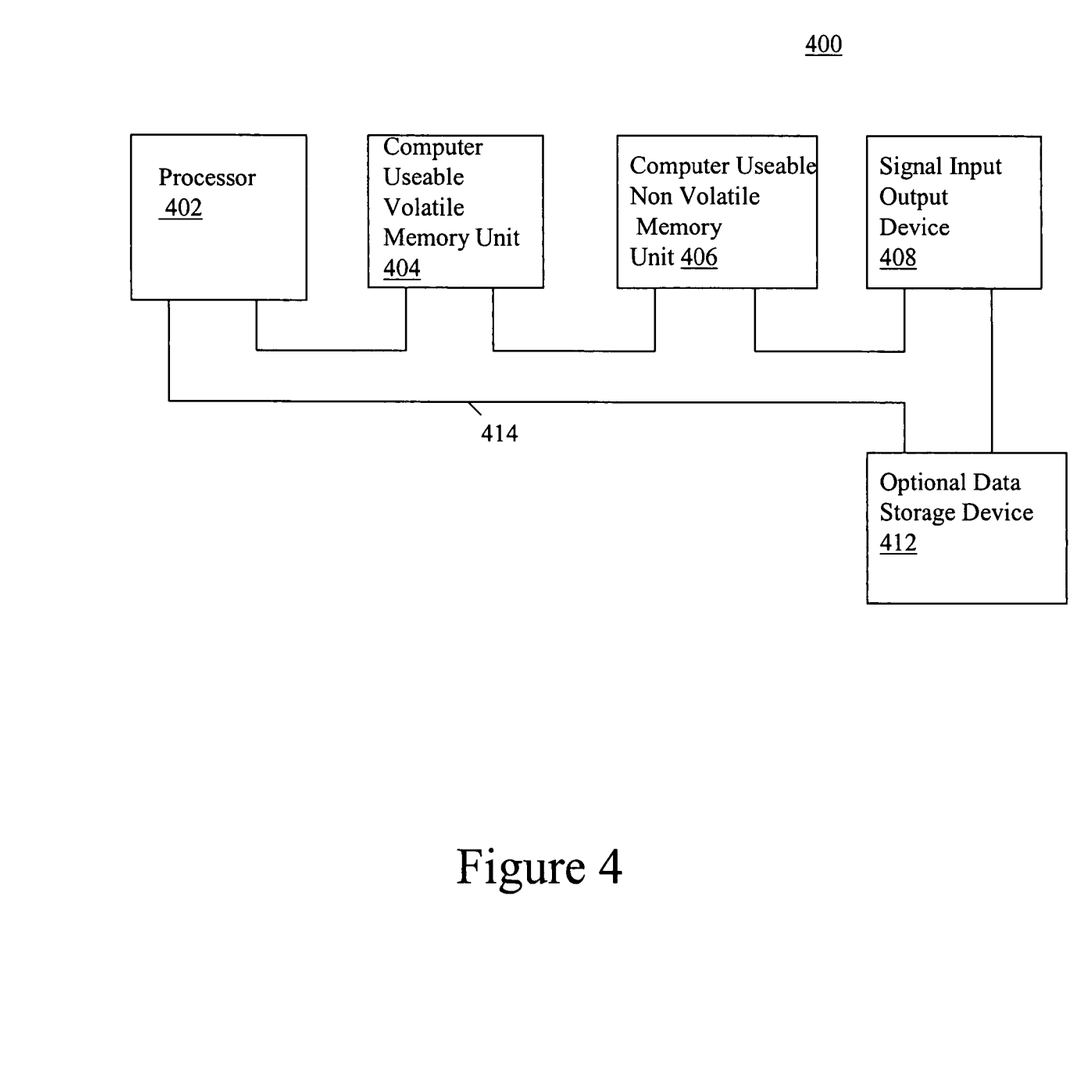
FIG. 4 is a block diagram of an exemplary computer system 400 in accordance with embodiments of the present invention.

FIG. 4 is a block diagram of an exemplary computer system 400 in accordance with embodiments of the present invention. System 400 may be well suited to be any type of electronic computing device (e.g., server computer, embedded computing device, portable computing system etc.). Within the following discussions herein, certain processes and steps are discussed that are realized, in some embodiments, as a series of instructions (e.g., software program) that reside within computer readable memory units of computer system 400 and executed by a processor(s) of system 400. When executed, the instructions cause computer 400 to perform specific actions and exhibit specific behavior which is described in detail below. According to one embodiment, the instructions may include code that when executed perform the method for selecting one or more charging profiles for a mobile data service session.

Computer system 400 of FIG. 4 comprises an address/data bus 414 for communicating information, one or more central processors 402 coupled with bus 414 for processing information and instructions. Central processor unit 402 may be a microprocessor or any other type of processor. The computer 400 also includes data storage features such as a computer usable volatile memory unit 404 (e.g., random access memory, static RAM, dynamic RAM, etc.) coupled with bus 414 for storing information and instructions for central processor(s) 402, a computer usable non-volatile memory unit 406 (e.g., read only memory, programmable ROM, flash memory, EPROM, EEPROM, etc.) coupled with bus 414 for storing static information and instructions for processor(s) 402. System 400 also includes one or more signal generating and receiving devices 408 coupled with bus 414 for enabling system 400 to interface with other electronic devices. The communication interface(s) 408 of the present embodiment may include wired and/or wireless communication technology such as a wireless telephone circuitry. For example, in some embodiments, the communication interface 408 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

The system 400 may also include a computer usable mass data storage device 412 such as a magnetic or optical disk and disk drive (e.g., hard drive or floppy diskette) coupled with bus 414 for storing information and instructions.

In accordance with exemplary embodiments thereof, methods and systems for selecting a charging profile for a mobile data service session are disclosed. A method includes identifying one or more available sources of charging profiles that each provide a charging profile for a mobile data service user and selecting a charging profile to be used for at least a portion of the mobile data service session based on selection criteria that ranks the available sources of charging profiles. Access is provided to the selected charging profile for use in billing the mobile data service user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for selecting one or more charging profiles for a mobile data service session, comprising:
 identifying a plurality of available sources of charging profiles that each provide a charging profile for a mobile data service user;
 selecting a charging profile from the plurality sources identified to be used for at least a portion of said mobile data service session based on source rankings derived using criteria to rank said available sources of charging profiles;
 wherein the charging profiles are ranked in order of precedence;
 wherein said selection criteria ranks sources of charging profiles according to the following order: first, an override rule for an access point or box level global, second, a profile server, third, a serving support node (SGSN) and fourth, a default charging profile configured in access point or box; and
 providing access to said charging profile for use in billing said mobile data service user.

2. The method of claim 1, wherein said charging profile is selected based on the location of said mobile data service user.

3. The method of claim 1, wherein said charging profile contains information that designates a service user as pre-paid or post-paid.

4. The method of claim 1, wherein for a pre-paid user said charging profile includes the address of a corresponding online charging server.

5. The method of claim 1, wherein said charging profile is selected during mobile data service session authorization.

6. The method of claim 1, detecting that the mobile data service session is executing in a new location and dynamically changing said charging profile during the mobile data service session based on the detection of the new location.

7. The method of claim 1, wherein said sources of charging profile are selected from the group that includes a profile server, a serving support node (SGSN), and a stored default charging profile.

8. An apparatus, comprising:
 a computer readable memory unit;
 one or more processors coupled to said memory unit, said one or more processors for executing a method for selecting one or more charging profiles for a mobile data service session, comprising:
 identifying a plurality of available sources of charging profiles that each provide a charging profile for a mobile data service user;
 selecting a charging profile to be used for at least a portion of said mobile data service session based on source rankings derived using criteria to rank said available sources of charging profiles;
 wherein the charging profiles are ranked in order of precedence; and
 providing access to said charging profile for use in billing said mobile data service user;
 wherein a charging profile rank order of precedence is determined from highest priority to lowest priority according to the following criteria in order of precedence: an override rule for an access point, one or more charging profiles received from a charging profile server, one or more charging profiles received from a serving support node (SGSN) and one or more default charging profiles configured in an access point.

9. The apparatus of claim 8 wherein said charging profile contains information that designates a service user as pre-paid or post-paid.

10. The apparatus of claim 8 wherein for a pre-paid user said charging profile includes the address of a corresponding online charging server.

11. The apparatus of claim 8 wherein said charging profile is selected during mobile data service session authorization.

12. The apparatus of claim 8 wherein said charging profile is changed after the establishment of said mobile data service session.

13. The apparatus of claim 8 wherein said sources of charging profiles are selected from the group that includes a profile server, a serving support node (SGSN), and a stored default charging profile.

14. The apparatus of claim 8, wherein said selection criteria ranks sources of charging profiles as follows: first, an override rule for an access point or box level global, second, a profile server, third, a serving support node (SGSN) and fourth, a default charging profile configured in access point or box.

15. A system for selecting one or more charging profiles for a mobile data service session, comprising:
 means for identifying a plurality of available sources of charging profiles that each provide a charging profile for a mobile data service user;
 means for selecting a charging profile from the plurality of sources to be used for at least a portion of said mobile data service session based on source rankings derived using criteria to rank said available sources of charging profiles, wherein a charging profile rank order of precedence is determined from highest priority to lowest priority according to the following criteria in order of precedence: an override rule for an access point, one or more charging profiles received from a charging profile server, one or more charging profiles received from a serving support node (SGSN) and one or more default charging profiles configured in an access point; and
 means for providing access to said charging profile for use in billing said mobile data service user.

16. The apparatus of claim 15 wherein said charging profile is selected based on location of said mobile data service user.

17. The apparatus of claim 15 wherein said charging profile contains information that designates a service user as pre-paid or post-paid.

18. The apparatus of claim 15 wherein for a pre-paid user said charging profile includes the address of a corresponding online charging server.

* * * * *